J. A. ROSS.
AUTOMOBILE SIGNAL.
APPLICATION FILED JAN. 10, 1914.
1,111,615.
Patented Sept. 22, 1914.
2 SHEETS—SHEET 1.
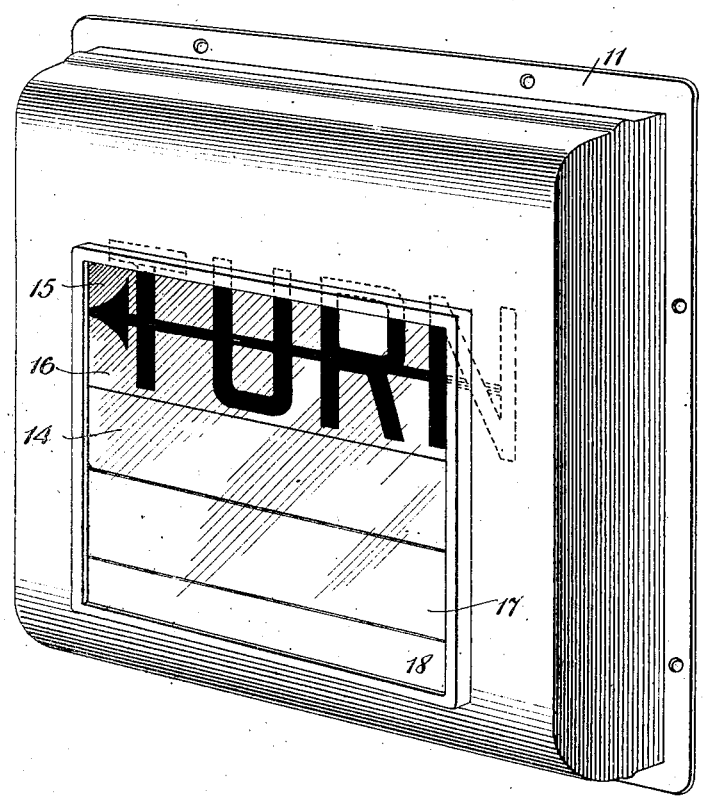
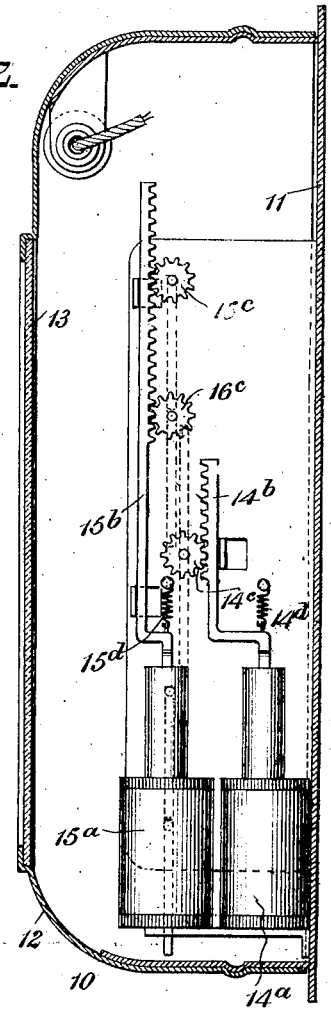
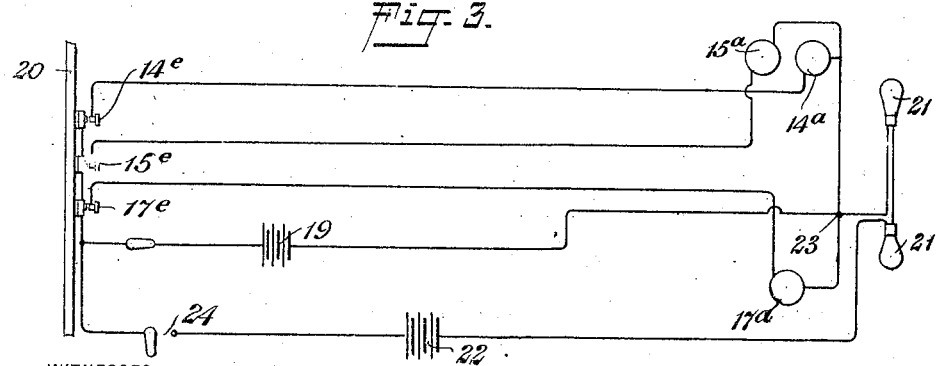
WITNESSES
INVENTOR
John A. Ross
BY
ATTORNEYS J. A. ROSS.
AUTOMOBILE SIGNAL.
APPLICATION FILED JAN. 10, 1914.
1,111,615.
Patented Sept. 22, 1914.
2 SHEETS—SHEET 2.
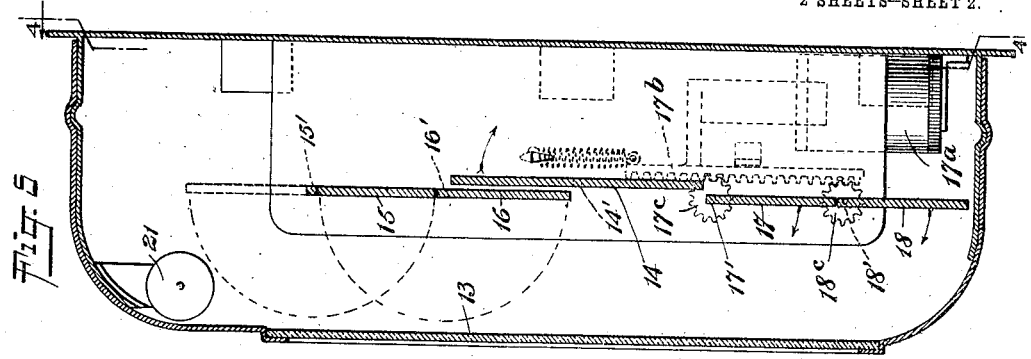
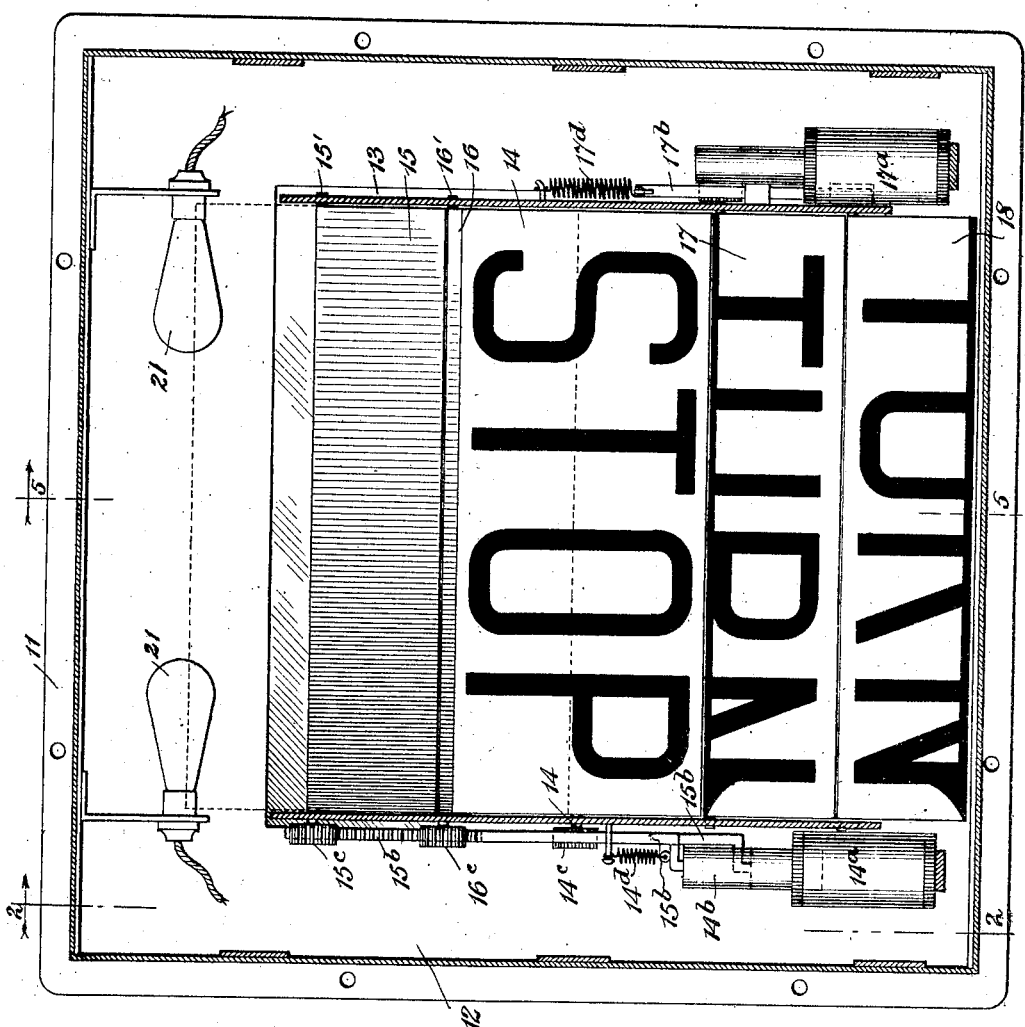
WITNESSES
William P. Goebel
Geo. L. Beeler
INVENTOR
John A. Ross
BY
ATTORNEYS

UNITED STATES PATENT OFFICE.

JOHN A. ROSS, OF NEW YORK, N. Y., ASSIGNOR OF ONE-THIRD TO FREDERIC PONS, OF NEW YORK, N. Y.

AUTOMOBILE-SIGNAL.

1,111,615.  Specification of Letters Patent.  Patented Sept. 22, 1914.

Application filed January 10, 1914. Serial No. 811,394.

*To all whom it may concern:*

Be it known that I, JOHN A. ROSS, a citizen of the United States, and a resident of the city of New York, borough of Manhattan, in the county and State of New York, have invented a new and Improved Automobile-Signal, of which the following is a full, clear, and exact description.

This invention relates to automobile appliances, and has particular reference to signaling devices for use especially on the rear ends of automobiles.

Among the objects of this invention is to provide a device of the character indicated under the control of the chauffeur or other occupant of the vehicle but indicating to persons back of the automobile the intended movements of the automobile.

A further object of the invention is to provide a casing of a neat and compact nature adapted to be attached to or carried by an automobile or other vehicle which, under ordinary conditions, is inconspicuous but which, when controlled by certain devices within reach of an occupant of the vehicle, will indicate that the vehicle is to be stopped or turned to the right or to the left.

A still further object of the invention is to provide a casing of the nature set forth which carries within it lighting devices serving at night as a rear end or tail lamp and acting also to lighten the face of the signal mechanism above referred to.

The foregoing and other objects of the invention will hereinafter be more fully set forth and claimed and illustrated in the drawings forming a part of this specification in which like characters of reference indicate corresponding parts in all the views, and in which—

Figure 1 is a perspective view of the outside of a signal casing, the parts being in position indicated in Figs. 4 and 5; Fig. 2 is a vertical section on the line 2—2 of Fig. 4, but indicating the electromagnets in normal position; Fig. 3 is a diagram indicating the electromagnets, batteries and wiring; Fig. 4 is a vertical section on the line 4—4 of Fig. 5; and Fig. 5 is a vertical section on the line 5—5 of Fig. 4.

The several parts of the device may be made of any suitable materials, and the relative sizes and proportions, as well as the general design of the mechanism, may be varied to a considerable extent without departing from the spirit of the invention hereinafter more fully set forth and specifically claimed.

The casing 10 comprises a base 11 adapted to be secured preferably in a vertical position at the rear end of an automobile or other vehicle, and the casing also includes a closure or cap 12 adapted to be detachably secured to the base and carrying a transparency 13 in its vertical face.

Without unnecessarily limiting the scope of this invention, it may be described as comprising a plurality of rotary panels 14, 15, 16, 17 and 18, all of said panels being pivoted on horizontal axes in close parallel vertical planes. The panel 14 is pivoted at 14' along its center. Said panel is shown as being plain or unlettered on its normally outside face and provided with the word "Stop" in large letters on its normally inner face. The panels 15 and 16 are pivoted along their normally lower edges at 15' and 16' respectively. Likewise the panels 17 and 18 are pivoted along their upper edges at 17' and 18' respectively. Each pair of the last mentioned panels carry the word "Turn" together with an arrow indicating the direction in which the turn is to be made, and the members of each pair are intended to rotate simultaneously in the same direction so as to swing through an angle of 180 degrees and for one of such members to substantially take the place of the other. The relation of the members of each pair of panels to each other and to their pivots is such that said members occupy substantially the same plane in either their normal or shifted position. The relation, furthermore, of the pivots 16' and 17' to the central panel 14 is such that the panels 16 and 17 are normally out of the way for free movement of the panel 14 around its pivot, said panel 14 occupying the principal space, therefore, or view through the transparency 13.

Any suitable means may be provided to control the movements of the several panels. As a preferred means for accomplishing this purpose in a simple and satisfactory manner, I provide three electromagnets 14ª, 15ª and 17ª, each of said electromagnets having an armature carrying a rack, the several racks being indicated by the characters 14ᵇ, 15ᵇ and 17ᵇ respectively. The magnet 14ª relates to the central panel 14, the axis 14' of which has secured to it a pinion 14ᶜ meshing with the rack 14ᵇ. The armature is held normally in upright position by means of a spring 14ᵈ when the magnet is not energized, and the action of the rack through the pinion 14ᶜ is such under certain conditions as to hold the panel 14 with its unlettered face adjacent the transparency or window 13. When, however, the magnet 14 is energized, the pinion 14ᶜ will be given one half a rotation, causing the panel 14 to display the word "Stop" through the window. The magnet 15ᵃ with its rack acts upon two pinions 15ᶜ and 16ᶜ secured respectively to the axes 15' and 16' whereby a movement of the rack in either direction, either under the force of the magnet or the counteracting spring 15ᵈ, causes simultaneous rotation of the panels 15 and 16. Figs. 1 and 5 show the panels 15 and 16 turned to display the legend "Turn" with an arrow leading toward the left. The magnet 17ᵃ acts through its rack 17ᵇ to turn a pair of pinions 17ᶜ and 18ᶜ acting in turn upon the panels 17 and 18 in the manner above described. The force of the magnet acts against a spring 17ᵈ serving to restore the rack and panels to normal position, as shown in Figs. 4 and 5. These panels when rotated and turned upwardly under the force of the magnet 17ᵃ acting downwardly upon the pinions 17ᶜ and 18ᶜ move in the direction indicated by the arrows on Fig. 5, and present the legend "Turn" with an arrow leading toward the right.

At 19 I show a battery in circuit with the electromagnets above described and at 14ᵉ, 15ᵉ and 17ᵉ I show push buttons serving to complete the circuit from said battery 19 through the respective electromagnets for the purposes above set forth. Said push buttons may be located on the dashboard 20 or at any other convenient place within reach of the occupant of the vehicle having charge thereof.

At 21 I show one or more lamps in circuit with an auxiliary battery 22 which may be used to supplement the force of the primary battery 19 for night service. The lamp circuit is connected at 23 with the electromagnet circuit above described. A switch 24 normally open during the daytime is so arranged as to bring the auxiliary circuit into action in the night to light the lamps which are located preferably in the casing above the window 13, serving the usual purposes of a tail lamp, lighting up the face of the active panels. The wiring indicated in Fig. 3 shows that the lamp or lamps will always be burning when the switch 24 is closed irrespective of the manipulation of the push buttons.

Having thus described my invention, I claim as new and desire to secure by Letters Patent:—

1. In a signal mechanism of the character set forth, the combination of a casing adapted to be secured to the rear end of an automobile, a window in the face of said casing, a series of panels journaled on parallel axes within the casing and adjacent the window, said panels having plane faces arranged normally in view through said window, a series of electromagnets serving to selectively rotate said panels through 180 degrees, certain of said panels being arranged in pairs, the panels of each pair occupying the same vertical plane and rotatable simultaneously in the same direction, one of said panels of the pair taking the place of the other and still lying in the same plane, a display legend on said panels, a part of the legend being on one panel and the other part being on the other panel, and means to restore said panels to normal position after the magnets are deënergized.

2. In a signal mechanism of the kind set forth, the combination of a casing, a panel journaled on a central axis intermediate said casing, pairs of panels journaled on axes parallel to the axis of the first-mentioned panel, the pairs of panels being journaled on axes adjacent their edges, the members of each pair being so arranged that when they swing on their axes in the same direction, one of them will take the place of the other and both will display a single legend, one half of which is carried by one panel and the other half by the other panel, a series of electromagnets associated with the several panels, means to selectively energize said magnets to actuate certain of said panels, and means to restore the panels to normal position after the magnets are deënergized.

In testimony whereof I have signed my name to this specification in the presence of two subscribing witnesses.

JOHN A. ROSS.

Witnesses:
GEO. L. BEELER,
PHILIP D. ROLLHAUS.